April 17, 1962 W. J. KNOCHEL ETAL 3,030,542
ELECTROLUMINESCENT DEVICE
Filed June 23, 1959

INVENTORS
WILLIAM J. KNOCHEL,
EUGENE F. MURPHY and
HENRY SKWIRUT.
BY W. D. Palmer
ATTORNEY

United States Patent Office 3,030,542
Patented Apr. 17, 1962

3,030,542
ELECTROLUMINESCENT DEVICE
William J. Knochel, West Orange, Eugene F. Murphy, Essex County, and Henry Skwirut, Verona, N.J., assignors to Westinghouse Electric Corporation, East Pittsburgh, Pa., a corporation of Pennsylvania
Filed June 23, 1959, Ser. No. 822,231
4 Claims. (Cl. 313—108)

This invention relates to electroluminescent cells and, more particularly, to an electroluminescent cell which is protected against the deleterious effects of moisture-containing atmospheres.

The phenomenon of electroluminescence was first disclosed by G. Destriau, one of his earlier publications appearing in London, Edinburgh and Dublin Philosophical Magazine series 7, volume 38, No. 285, pages 700–737 (October 1947). Since this time, considerable research and engineering effort has been expended on the phenomenon of electroluminescence and such devices have been marketed commercially. One of the main drawbacks to commercial utilization of electroluminescent devices is the poor maintenance of light output which is due in great part to the deleterious effects of moisture. The deleterious effect of moisture has been disclosed in U.S. Patent No. 2,821,646, dated January 28, 1958. In accordance with this patent, the entire cell is incorporated into a surrounding fixture which is impervious to moisture and a dessicating agent is also incorporated into the fixture to getter any moisture which may be present.

The brightest electroluminescent cells are those wherein the prepared phosphor material is embedded in plastic dielectric material with the phosphor-dielectric included between spaced electrodes. In such a construction, one electrode is usually formed of an electrically-conducting layer such as tin oxide carried on a glass foundation with a phosphor-dielectric layer coated thereover. A second electrode, which is normally formed of vacuum-metallized aluminum, is positioned over the phosphor-dielectric layer. When an electrical potential is applied between the two electrodes, the resulting electric field causes the phosphor material to emit visible light. While such electroluminescent cells have a good initial light output as compared to a cell wherein the phosphor is embedded in glass dielectric material, such plastic-type cells are particularly susceptible to damage by moisture-containing atmospheres.

In order to overcome the foregoing and other difficulties of and objections to prior-art practices, it is the general object of this invention to provide an electroluminescent cell having improved maintenance of light output.

It is a further object to provide an electroluminescent cell having good initial brightness and improved maintenance of light output wherein the thickness and overall dimensions of the cell are not appreciably increased in size.

It is another object to provide an electroluminescent cell having improved maintenance of light output wherein the cell is not unduly complex or costly to manufacture.

The aforesaid objects of the invention, and other objects which will become apparent as the description proceeds, are achieved by providing an electroluminescent cell wherein moisture-pervious portions of the cell surface structure are sealed against ingress of moisture by a layer at least principally comprising epoxy resin. More specifically, there is provided an electroluminescent cell which utilizes a plastic dielectric material for good initial brightness and a second electrode formed of vacuum-metallized material, wherein ingress of moisture through moisture-pervious surface portions of the cell structure is inhibited by a layer at least principally comprising epoxy resin with the vacuum-metallized electrode separated from direct contact with the epoxy resin.

For a better understanding of the invention, reference should be had to the accompanying drawings wherein:

FIG. 1 is a fragmentary sectional elevational view, taken on the line II—II in FIG. 3, showing an electroluminescent cell wherein the cell electrodes are formed as an interlacing, raster-type grid and wherein moisture-permeable surface portions of the cell are encased by a layer of epoxy resin;

Figure 1:
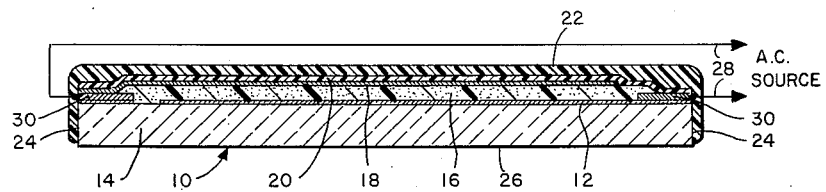
FIG. 1 is a sectional elevational view of an electroluminescent cell wherein the phosphor material is embedded in plastic dielectric and wherein moisture-permeable surface portions of the cell are encased by a layer of epoxy resin.

With specific reference to the form of the invention as illustrated in the drawings, the number 10 in FIG. 1 indicates generally an electroluminescent cell comprising a first electrode 12 formed on a glass foundation 14. A layer 16 of phosphor embedded in dielectric material is positioned over the electrode 12 and a second conducting electrode layer 18 is positioned over the phosphor-dielectric layer 16. The electrodes 12 and 18 and phosphor-dielectric layer 16 form the operative portion of the cell 10. An additional liquid-impervious layer 20 is carried over and adheres to the second electrode 18 exterior to the operative portion of the cell 10 and a moisture-impervious layer 22 of epoxy resin is carried over the additional layer 20 and extends around the sides of the cell 10 and onto the edge portions 24 of the glass foundation 14. Since the glass foundation 14 and the layer 22 of epoxy resin are both quite impervious to penetration by moisture, the resulting electroluminescent cell is effectively sealed and protected against ingress of moisture which would deleteriously effect cell operation. Light which is generated by the cell 10 is emitted from the viewing face 26 of glass foundation 14.

The glass foundation 14 can be fabricated of any conventional light-transmitting glass material and as an example has a thickness of one-eighth inch. The first electrode 12 can be formed of a very thin coating of electrically-conducting and light-transmitting tin oxide, such coatings being well known. Other similar coatings such as indium oxide can be substituted therefor. The layer 16 comprising the phosphor-dielectric can be formed of any electroluminescent phosphor embedded in light-transmitting dielectric material with plastic dielectric being preferred for best brightness. As an example, the electroluminescent phosphor is formed of finely-divided zinc sulfide which is activated by copper and coactivated by chlorine. Such phosphor is well known and other electroluminescent phosphors are summarized in Destriau and Ivey article in Proceedings of the I.R.E., volume 43, No. 12, pages 1911–1940 (December 1955). As noted, the dielectric material in which the phosphor is embedded is preferably plastic and, as one example, the plastic dielectric is polyvinylchloride acetate. Other plastic dielectric material can be substituted therefor. The relative proportions of phosphor and dielectric which comprise the layer 16 are not critical and by way of example, equal parts by weight of phosphor and dielectric are used to form the layer 16. The thickness of the layer 16 is two mils and this thickness can be varied.

The second electrode 18 is formed of vacuum-metallized material, preferably aluminum, although other metals such as silver can be used. The thickness of the electrode 18 is not critical, but as an example is 1500 A.U. Vacuum-metallized coatings are inherently porous in nature and while having sufficient structural continuity to display electrical continuity through any portion thereof, such coatings also have such discontinuity of structure as to permit ingress of unpolymerized liquid epoxy resin. When such a vacuum-metallized electrode is used, an encasing polymerizable resin or similar material will tend to penetrate the pores or voids in the vacuum-metallized electrode when the resin passes through the liquid phase before or during polymerization. Such a penetration impairs the electrical continuity of the vacuum-metallized electrode 18 and thus the performance of the cell. For this reason, it is necessary to include over the vacuum-metallized electrode 18, the additional layer 20 of material which has such structural continuity as to be impervious to passage of liquid epoxy resin therethrough. As an example, the layer 20 can be formed of Canada balsam or a suitable alkyd resin which is applied in such manner that the voids in the electrode 18 remain substantially uncontaminated with any of the material which forms the additional layer 20. The material comprising the layer 20 also adheres directly to the surface of the electrode 18 and such adherence is necessary to prevent the layer 20 from floating in the liquid epoxy resin during application of same and to prevent ingress of liquid epoxy resin proximate the edges of the electrode 18. Thus the additional layer 20 prevents ingress of liquid epoxy resin into the pores of the vacuum-metallized electrode 18 when such protecting layer 22 is applied over the moisture-permeable surfaces of the cell 10.

As noted, the moisture-impervious layer 22 at least principally comprises epoxy resin. Such epoxy resins are well known and are available from a number of different manufacturers. It is preferred to use an epoxy resin marketed by Bakelite Company under the designation "Bakelite 3794." Epoxy resins represent a class of condensation polymers and a typical formula for such resins is as follows:

The foregoing formula can be varied somewhat and addition polymers can be added to the epoxy resin, as is well known. A catalyst is used to cause the resin to polymerize and on polymerization, the chain lengthens and there is considerable cross-linking between individual chains. There are numerous suitable catalysts which can be used in fabricating the present cell. The preferred catalyst is a mixture of 50% by weight ethylenetriamine and 50% by weight acrylonitrile and such catalysts for use with these resins are well known. Examples of other epoxy resin catalysts are ethylenediamine, tetraethylenepentamine, piperidine and metaphenylenediamine. When the foregoing amine catalysts are used, the pot life for the resin is relatively short and the mixed resin and catalyst must be applied over the otherwise-fabricated cell shortly after the catalyst has been added to the resin. As a general rule the amine catalysts should constitute from about six to about fifteen percent by weight of the resin. Other materials can be added to the epoxy resins to modify their characteristics. As an example, 20 to 45 percent by weight of a polyamide can be added to the epoxy resins to increase their flexibility, which inhibits any tendency for failure under stress. See "Epoxy Resins" by Lee and Neville, published by McGraw-Hill (1957) for a discussion of such modified epoxy resins.

In fabricating the cell 10, the phosphor-dielectric layer 16 is first applied to the light-transmitting electrode 12 by conventional practices and the second electrode 18 vacuum metallized onto the layer 16. The additional layer 20 of liquid-impervious material is then applied over the vacuum-metallized electrode 18 by conventional spray techniques using very volatile solvents. As an example, the layer 20 has a thickness of two mils and this thickness can be varied. The lead-conductors 28 which constitute a means for connecting the cell electrodes across an electrical potential are electrically connected to the electrodes 12 and 18 by conventional bus bars 30. Thereafter the partially-fabricated cell is either dipped into the unpolymerized epoxy resin or the epoxy resin is flowed thereover to cover the moisture-permeable surface portions of the cell 10. In the case of the preferred indicated catalyst, resin polymerization is accomplished by heating the coated cell to a temperature of 50° C. for 30 minutes. In the cell embodiment 10 as shown in FIG. 1, the epoxy layer 22 covers the back portions of the cell including the additional layer 20 and extends down over the sides of the cell so as to form a moisture-impervious seal with the edges 24 of the glass foundation 14. In this manner, all moisture-permeable surface portions of the cell are protected by the layer of epoxy resin from ingress of moisture. It should be pointed out that while the additional layer 20 is impervious to passage of unpolymerized liquid epoxy resin therethrough, such layers are normally quite pervious to the penetration by moisture in vapor form. Thus in accordance with the present invention, any portions of the cell which are pervious to moisture in any form are encased with a layer at least principally comprising moisture-impervious epoxy resin. As an example, the layer 22 has a thickness of 45 mils. This thickness is not critical and is subject to considerable variation.

Figure 2:
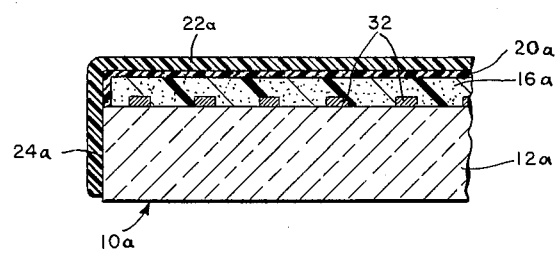
Figure 3:
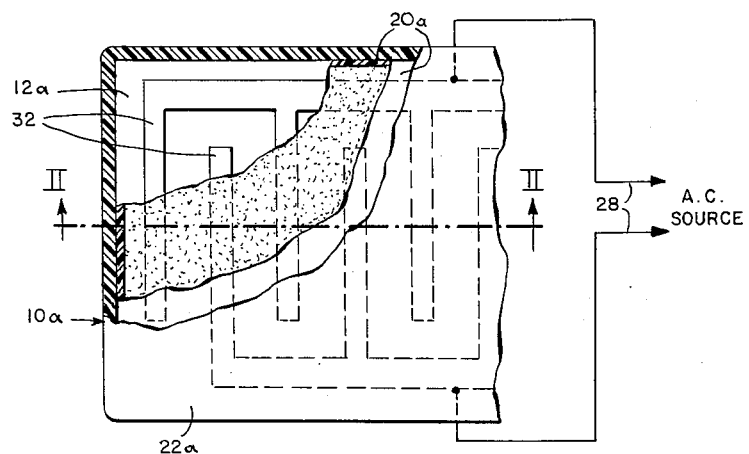
FIG. 3 is a fragmentary plan view, partly broken away, of the cell embodiment as shown in FIG. 2.

In FIGS. 2 and 3 are shown an alternative cell construction 10a wherein the cell electrodes 32 are formed as an interlacing, raster-type grid mesh. Such an electrode arrangement is generally described in U.S. Patent No. 2,684,450, dated July 20, 1954. In accordance with the present invention, a layer 22a which principally comprises epoxy resin is applied over the phosphor-dielectric layer 16a which is positioned over and between the spaced electrodes 32. The epoxy resin layer 22a is applied so as to extend down onto the edges 24a of the foundation 12a, which can be fabricated of glass or other suitable moisture-impervious material such as melamine. The additional layer 20a, which can be similar to the layer 20 as previously illustrated and described, is adherent to the phosphor-dielectric layer 16a and is positioned intermediate the layers 16a and 22a. If the foundation 12a is not light transmitting, the layers 20a and 22a are selected to be light transmitting.

Figure 4:
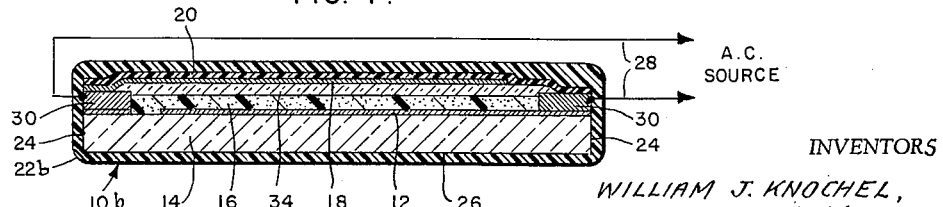
FIG. 4 is a sectional elevational view of an alternative construction for a cell embodiment generally as shown in FIG. 1, wherein an additional layer of material having high electrical-puncture strength is also included between the cell electrodes and wherein the entire cell is encased by a layer of epoxy resin.

In FIG. 4 is shown a further cell embodiment 10b which generally corresponds to the embodiment 10 as shown in FIG. 1 except that an additional layer 34 of material having a very high electrical puncture strength is also included between the cell electrodes. Such an additional layer can be formed of barium titanate or titania for example, as disclosed in British Patent No. 765,076, published October 22, 1954. The cell embodiment as shown in FIG. 4 is also modified somewhat in that the layer 22b which comprises light-transmitting epoxy resin encapsulates the entire cell. Such a construction lends itself to a dip process for applying the epoxy resin layer 22b.

In controlled tests, when operated under normal conditions of 50% average relative humidity and 26° C., electro-luminescent cells protected from moisture in accordance with the present invention displayed after 15,000 hours' operation a lumen maintenance better than that displayed after only 300 hours by otherwise similar but unprotected control cells. Even under extreme conditions of operation, such as 98% relative humidity and 50° C., the present protected cells operated satisfactorily without failure for from 500 to 1500 hours, whereas the unprotected cells failed almost immediately.

It will be recognized that the objects of the invention have been achieved by providing an electroluminescent cell having improved maintenance of light output wherein the thickness and overall dimensions of the cell are not appreciably increased in size and wherein the cell is not unduly complex or costly to manufacture.

As a possible alternative embodiment, the plastic dielectric material which is used as an embedding medium for the phosphor can be replaced by a glass dielectric, such a construction being well known. In accordance with the present invention, the encapsulating layer which principally comprises epoxy resin can be used to inhibit any ingress of moisture to the operative portions of the ceramic-type cell.

While best-known embodiments have been illustrated and described in detail, it is to be particularly understood that the invention is not limited thereto or thereby.

We claim:

1. An electroluminescent cell comprising, a glass foundation having a viewing face and edge portions, a light-transmitting first electrode carried on said glass foundation, a second metallic electrode spaced from said first electrode, said second electrode having sufficient structural continuity to display electrical continuity through any portion thereof but also having such discontinuity of structure as to permit ingress of liquid, a layer comprising electroluminescent phosphor included between said spaced electrodes, said spaced electrodes and said layer comprising electroluminescent phosphor forming the operative portion of said cell, an additional layer of material over and adherent to said second electrode and exterior to the operative portion of said cell, said additional layer of material having such structural continuity as to be impervious to passage of liquid therethrough, discontinuities in said second electrode remaining substantially uncontaminated with any material comprising said additional layer, a layer at least principally comprising moisture-impervious epoxy resin over and adherent to said additional layer of material and extending at least onto the edge portions of said glass foundation, and means for connecting said electrodes across a source of electrical potential.

2. An electroluminescent cell comprising, a glass foundation having a viewing face and edge portions, a light-transmitting first electrode carried on said glass foundation, a second aluminum electrode spaced from said first electrode, said second electrode having sufficient structural continuity to display electrical continuity through any portion thereof but also having such discontinuity of structure as to permit ingress of unpolymerized liquid epoxy resin, a layer comprising electroluminescent phosphor included between said spaced electrodes, said spaced electrodes and said layer comprising electroluminescent phosphor forming the operative portion of said cell, an additional layer of plastic material over and adherent to said second electrode and exterior to the operative portion of said cell, said additional layer of plastic material having such structural continuity as to be impervious to passage of unpolymerized liquid epoxy resin therethrough, discontinuities in said second electrode remaining substantially uncontaminated with any plastic material comprising said additional layer, a layer at least principally comprising moisture-impervious epoxy resin over and adherent to said additional layer of material and extending at least onto the edge portions of said glass foundation, and means for connecting said electrodes across a source of electrical potential.

3. An electroluminescent cell comprising, a glass foundation having a viewing face and edge portions, a light-transmitting first electrode carried on said glass foundation, a second aluminum electrode spaced from said first electrode, said second electrode having sufficient structural continuity to display electrical continuity through any portion thereof but also having such discontinuity of structure as to permit ingress of unpolymerized liquid epoxy resin, a layer comprising electroluminescent phosphor included between said spaced electrodes, said spaced electrode and said layer comprising electroluminescent phosphor forming the operative portion of said cell, an additional layer of plastic material over and adherent to said second electrode and exterior to the operative portion of said cell, said additional layer of plastic material having such structural continuity as to be impervious to passage of unpolymerized liquid epoxy resin therethrough, discontinuities in said second electrode remaining substantially uncontaminated with any plastic material comprising said additional layer, a layer at least principally comprising light-transmitting and moisture-impervious epoxy resin completely encapsulating and adherent to said cell, and means for connecting said electrodes across a source of electrical potential.

4. The method of protecting from the deleterious effects of moisture, an electroluminescent cell which comprises a glass foundation having a viewing face and edge portions, a light-transmitting first electrode layer carried on said glass foundation, a second electrode layer spaced from said first electrode layer and formed of metal which has sufficient structural continuity to display electrical continuity through any portion thereof but which also has such discontinuity of structure as to permit ingress of liquid, and a layer comprising electroluminescent phosphor included between said first electrode layer and said second electrode layer, which method comprises: applying an adherent, continuous, liquid-impervious plastic layer over said second electrode layer to contact only the surface portion of said second electrode layer; applying over said plastic layer and extending onto at least the edge portions of said glass foundation, a liquid uncured epoxy resin; and thereafter curing said liquid epoxy resin in order to form a solid moisture-impervious epoxy resin layer which covers at least all portions of said electroluminescent device except the face portion thereof.

References Cited in the file of this patent
UNITED STATES PATENTS

| | | |
|---|---|---|
| 2,183,256 | Gabler | Dec. 12, 1939 |
| 2,222,788 | Touceda et al. | Nov. 26, 1940 |
| 2,755,406 | Burns | July 17, 1956 |
| 2,821,646 | Walker | Jan. 28, 1958 |
| 2,901,652 | Fridrich | Aug. 25, 1959 |
| 2,918,594 | Fridrich | Dec. 22, 1959 |